(12) United States Patent
Moschetti

(10) Patent No.: US 12,362,952 B2
(45) Date of Patent: Jul. 15, 2025

(54) CRYPTOGRAPHICALLY SECURED METHOD AND SYSTEM FOR SHARING AT LEAST ONE DATA RECORD ON A LOCAL DATABASE AMONG MULTIPLE PROCESSING NODES, WITHOUT USING A BLOCKCHAIN

(71) Applicant: Paul "Buzz" Moschetti, New York, NY (US)

(72) Inventor: Paul "Buzz" Moschetti, New York, NY (US)

( * ) Notice: Subject to any disclaimer, the term of this patent is extended or adjusted under 35 U.S.C. 154(b) by 266 days.

(21) Appl. No.: 18/308,238

(22) Filed: Apr. 27, 2023

(65) Prior Publication Data

US 2024/0364545 A1   Oct. 31, 2024

(51) Int. Cl.
*H04L 9/00* (2022.01)
*G06F 21/60* (2013.01)
*H04L 9/14* (2006.01)

(52) U.S. Cl.
CPC .............. *H04L 9/50* (2022.05); *G06F 21/602* (2013.01); *H04L 9/14* (2013.01)

(58) Field of Classification Search
CPC . H04L 9/50; H04L 9/14; H04L 9/3239; G06F 21/602
See application file for complete search history.

(56) References Cited

U.S. PATENT DOCUMENTS

| | | | |
|---|---|---|---|
| 9,225,719 B2 | 12/2015 | Moschetti | |
| 11,900,367 B2* | 2/2024 | Higgins | ........... G06Q 20/38215 |
| 2019/0334700 A1* | 10/2019 | Callan | ...................... H04L 9/083 |
| 2020/0302066 A1* | 9/2020 | Krishnaswamy | ... G06F 9/45558 |
| 2020/0357084 A1 | 11/2020 | Lerato Hunn | |
| 2021/0034606 A1 | 2/2021 | Stamos | |
| 2021/0141909 A1 | 5/2021 | Zhai | |
| 2021/0182804 A1* | 6/2021 | Tavanez | ................. G06Q 20/02 |
| 2022/0232423 A1* | 7/2022 | Thyagaturu | ........... H04W 28/10 |

OTHER PUBLICATIONS

How to use Ethereum, web3, and your own database for performant and cryptoassured shared data, Paul "Buzz" Moschetti, Linkedin, Apr. 26, 2023, https://www.linkedin.com/pulse/how-use-ethereum-web3-your-own-database-performant-cryptoassured%3FtrackingId=kS0bkzeG4SpBA5Vx%252FxahMA%253D%253D/?trackingId=kS0bkzeG4SpBA5Vx%2FxahMA%3D%3D.
Ksusynct, Paul "Buzz" Moschetti, Mar. 2023, www.susynct.com.

* cited by examiner

*Primary Examiner* — Abiy Getachew
(74) *Attorney, Agent, or Firm* — Dilworth IP, LLC

(57) ABSTRACT

A method and system for sharing at least one cryptographically assured data record on a local database among multiple entities, without using a blockchain. The method and system preserve immutability and non-repudiatability of data shared among multiple entities without requiring a blockchain, allowing for seamless and performant querying and integration with unshared data while maintaining cryptographic integrity.

15 Claims, 3 Drawing Sheets

CRYPTOGRAPHICALLY SECURED METHOD AND SYSTEM FOR SHARING AT LEAST ONE DATA RECORD ON A LOCAL DATABASE AMONG MULTIPLE PROCESSING NODES, WITHOUT USING A BLOCKCHAIN

FIELD

The field of the present disclosure relates generally to sharing data records on local databases in a cryptographically assured way without using blockchain technology.

BACKGROUND

Since the commercialization of the internet, the exchange of data between participants has primarily been accomplished by sending files of data to one another. As time progressed, the interactions have become more granular, real-time, with better APIs, and more expressive data formats. However, the basic pattern of transfer and data integration logic without strong multi-participant data integrity remains the same.

Blockchain technology has been developed to address the need for a decentralized, cryptographically secure data sharing system. However, blockchain technology suffers from performance and integration issues, and was not initially designed for the purpose of managing arbitrarily large or complex data.

There is a need for a method and system that allows multiple entities to share and synchronize copies of data on their local databases while maintaining data integrity, without the use of blockchain technology. Such a method and system should provide cryptographic assurance, be compatible with existing database infrastructure, and provide seamless integration and querying capabilities.

SUMMARY

The present disclosure provides a method and system for sharing copies of at least one data record on a local database among multiple entities in a cryptographically assured way, without using a blockchain.

"Cryptographic assurance" in the context of the present disclosure can mean using cryptographic techniques including, but not limited to, public and private keys, digests (e.g., SHA3), and digital signatures to prove both the immutable integrity of data and the non-repudiable identity of a participant signing (more broadly, "attesting to") the data. Specific existing algorithms such as AES, DES, and IDEA to encrypt and decrypt data are used in the framework of cryptographic assurance are but not necessarily features of the method or system.

"A blockchain" in the context of the present disclosure, is a decentralized, distributed digital ledger, enabling the recording of transactions across multiple computers in a peer-to-peer network. A blockchain includes linked data blocks containing transaction records, timestamps, and references to previous blocks, cryptographic techniques help ensure data security, providing tamper-resistance and verifiability. In the context of the present application, "a blockchain" refers to the general concept of such technology without indicating a specific instance or implementation, as would be implied when using the term "the blockchain."

More specifically, certain embodiments of the present disclosure outline a solution that preserves immutability and non-repudiatability of data shared among multiple entities without requiring a blockchain, allowing for seamless and performant querying and integration with other unshared data while maintaining cryptographic assuredness.

Certain embodiments, of the present disclosure relate to a method that includes setting up reference data for the entities, defining access entitlements and optional schemas for sections of data in a record to create a record specification ("spec"), facilitating the cosigning of both, and sharing a duplicate of the data record among the entities in a cryptographically assured way according to the spec. In some implementations, the cryptographic sharing of the duplicate data file is not recorded on a blockchain.

The method or system may include the entities connected over a communications network ("network"), where the entities are configured to set up reference data over the network, and at least one node on the network. A "node" in the context of the present disclosure is an active logic process, of some combination of software or hardware, that both waits for inbound requests to perform actions and based on various conditions will transmit requests to other nodes. Nodes may be configured to cosign the reference data by the entities to create a record spec, and share a duplicate of the data record in a cryptographically assured way among the entities.

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Embodiments of the present disclosure relate to a method and system for sharing at least one data record on a local database among multiple entities in a cryptographically assured way, without using a blockchain. The method includes setting up reference data for the entities, creating a spec, facilitating cosigning of the reference data and the spec, and sharing a duplicate of the at least one data record among the entities according to the spec in a cryptographically assured way.

Figure 1:
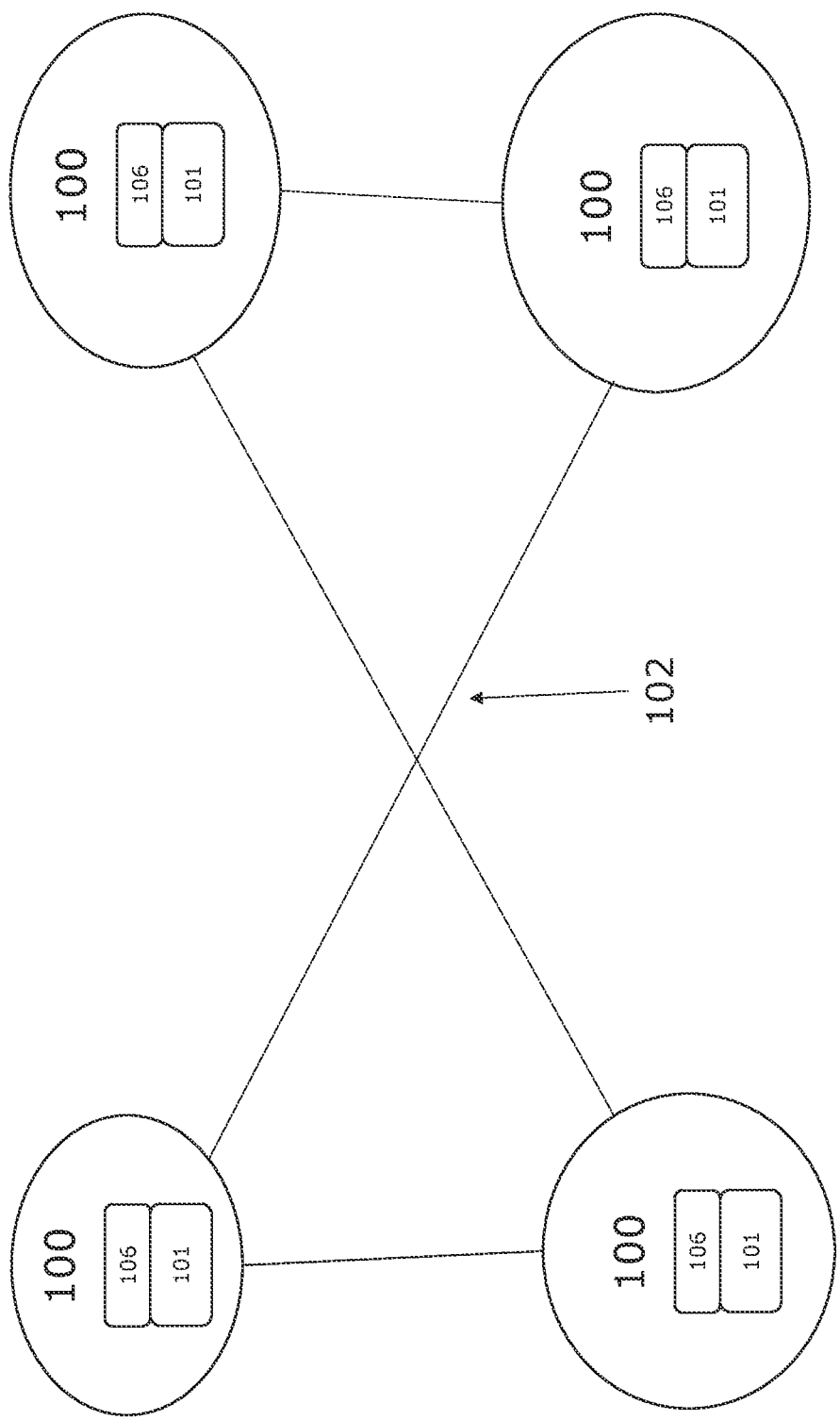
FIG. 1 is a block diagram illustrating an example system for sharing data among multiple entities in a cryptographically assured way without using a blockchain.

FIG. 1. illustrates a non-limiting example of a system for sharing data among multiple processing nodes in a cryptographically assured way without using a blockchain. The example system can include nodes 100, with each node processing activity for a different entity 101, connected over a network 102. The network 102 may facilitate communication among the nodes 100 in a peer-to-peer fashion. The system further includes a local database 106 that is managed by the node 100. Information associated with entity 101 is managed by local database 106.

The nodes 100 can be configured to interact with the local database 106 and the cryptographic data sharing system and services an entity 101 on behalf of the entity 101. The entities 101 can include various types of users, such as businesses, government agencies, or individuals, each having unique roles, responsibilities, and access levels within the system. Nodes 100 can be configured to perform actions such as, but not limited to, creating digital signatures, and creating, modifying, or accessing shared data records according to assigned access rights.

The network 102 can be any type of network that allows communication among the entities 101, such as the internet, a local area network (LAN), or a wide area network (WAN). The entities 101 can be any type of individuals, organizations, or devices that require access to the shared data.

The nodes 100 on the network 102 can be responsible for facilitating the sharing of data among the entities 101. The node 100 can be any type of computing device, or any combination of software or hardware, that is configured to perform the necessary computations and processes to share data according to the method described herein.

The local database 106 can provide reliable persistence and retrieval of information. The local database 106 may take any form of a resource that can persist and retrieve data; non-exclusive examples include plain files, file-backed memory caches, and database engines such as, but not limited to, Oracle or MongoDB. The local database 106 can persist data to any type of physical storage medium such as a hard disk drive, solid-state drive, non-volatile flash memory, or optical disk.

Figure 2:
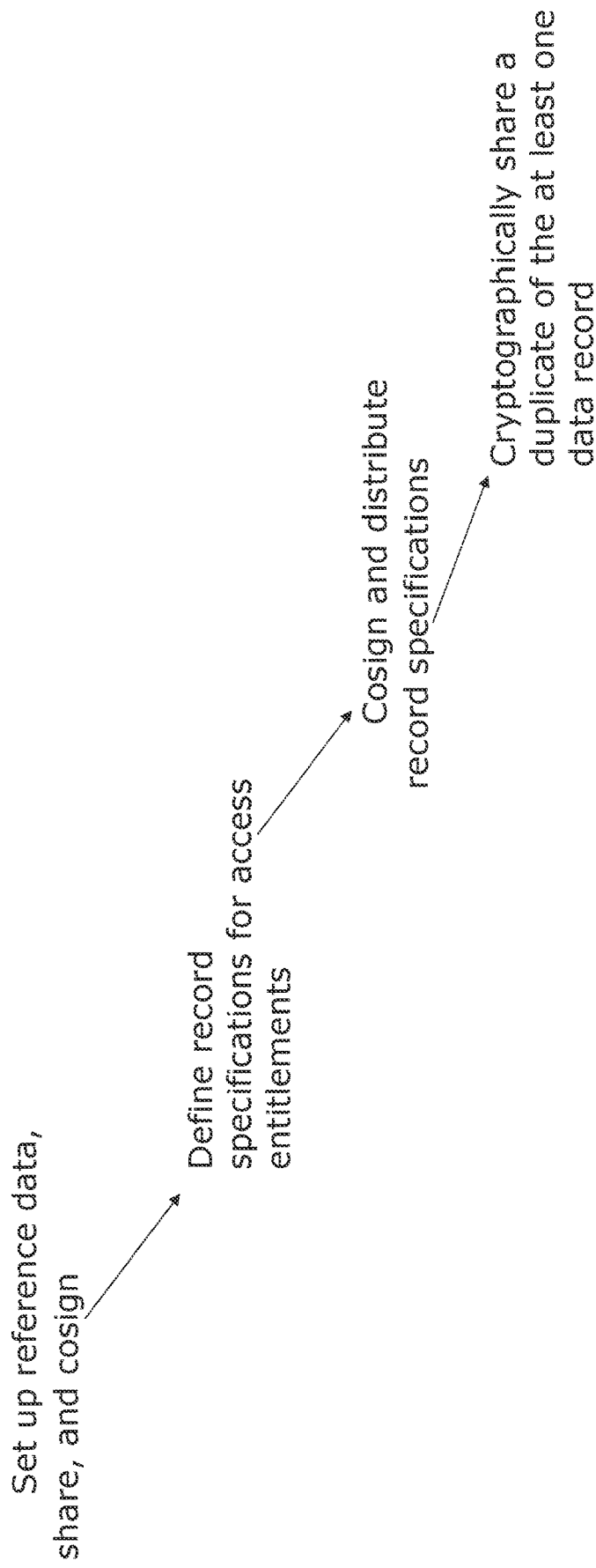
FIGS. 2-3 are flowcharts outlining an example method for sharing data among multiple entities in a cryptographically assured way without using a blockchain according to the present disclosure.
Figure 3:
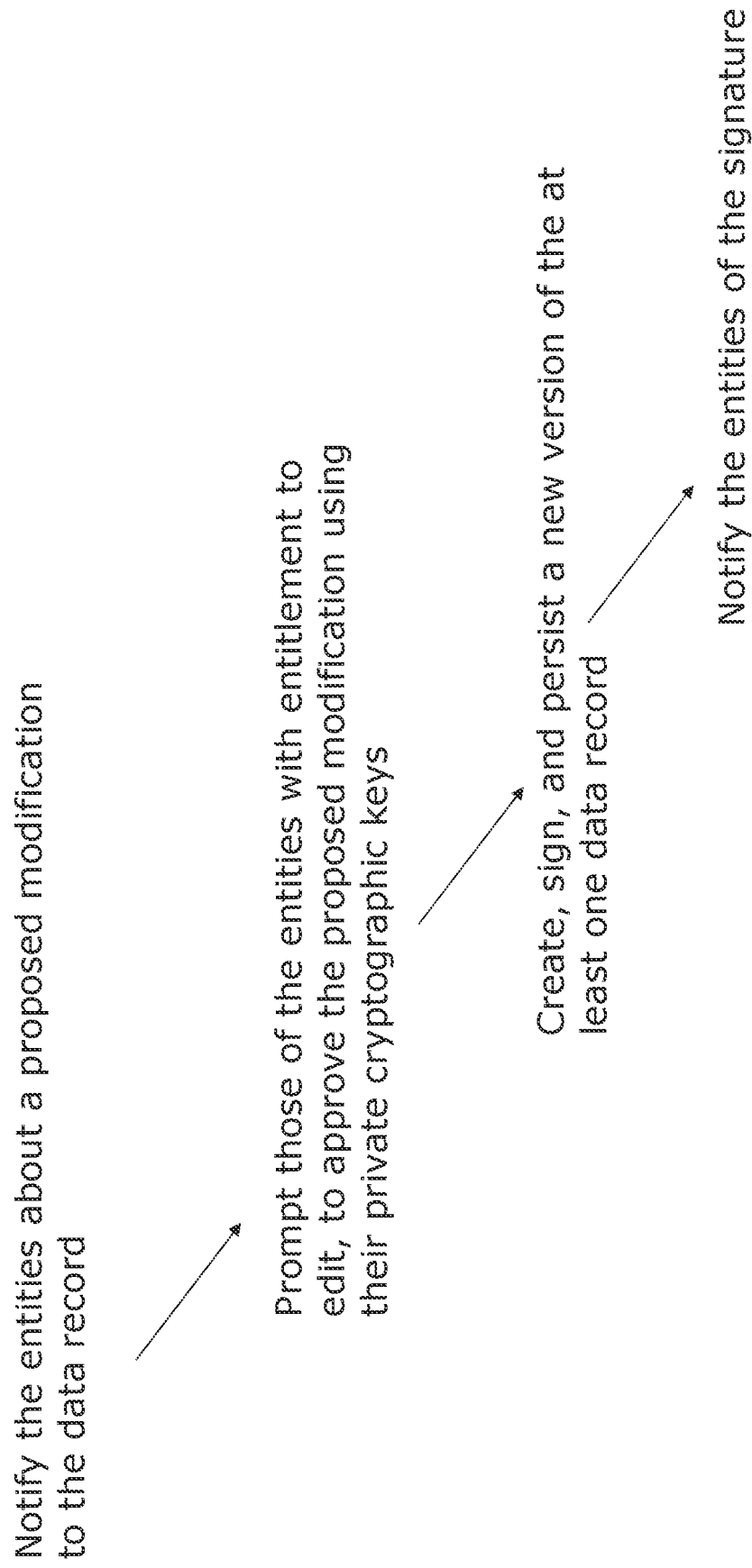

FIGS. 2-3 are flowcharts outlining an example method for cryptographically sharing data among multiple nodes in a cryptographically assured way without using a blockchain according to the present disclosure. As shown in FIG. 2, the method may begin by setting up reference data for the entities 101. The reference data may include names of the entities, public cryptographic keys associated with the entities, and communications network locations and endpoints ("addresses") associated with the entities. The nodes 100 can, in certain implementations, share the reference data over the network 102.

The reference data for the entities 101 can include the names of the entities, public cryptographic keys associated with the entities, and addresses associated with the entities. The names of the entities can be used to identify each of the entities 101 that are sharing the data. The public cryptographic keys associated with the entities can be used to validate digital signatures of the shared data. The addresses associated with the entities can be used to route the shared data to the appropriate node 100. The reference data can be shared among the nodes 100 over the network 102, with each node 100 having the ability to store a copy of the reference data for future use.

The cosigning can be performed using private cryptographic keys of the entities 101. The private cryptographic keys are not shared among the entities 101 and are kept secret by each entity to ensure the security of the shared data.

The shared data record can include multiple data sections as defined in the spec, with each data section being assigned a signing model and read or write access entitlements for the entities 101. The signing model can comprise a number of variables that govern the criteria under which a data section can be considered accepted by the entities 101. These variables may include but are not limited to the number of the entities 101 responding, the percentage responding, the elapsed time in which entities must respond to the initial proposal for change, the absolute date-time deadline by which they must respond, or if a signature may be revoked. The access entitlements may include "create" and "modify" and "audit" and others as necessary. Certain data sections may not be visible to those of the entities 101 that do not have read access to those data sections.

The method can further include sharing a duplicate of the at least one data record among the nodes 100 in a cryptographically assured way according to the spec. The duplicate of the at least one data record is persisted to the local database 106. The sharing can be performed without recording on a blockchain.

If there is a need to modify the at least one data record, some embodiments of the method may include initiating a modification to the at least one data record, as shown in FIG. 3. The initiation may include notifying the nodes 100 about a proposed modification to the data record, prompting those of the servicing entities with entitlement to edit to approve the proposed modification using their private cryptographic keys, and upon receiving approval in the form of digital signatures from the nodes with entitlement to edit, creating a new version of the at least one data record. In some embodiments, existing records are not modified-only new versions are added. The method may also include notifying the entities of the new version without storing the modification on a blockchain.

Changes to the duplicate can, in certain implementations, be persisted to the local database 106 using a lossless high-fidelity data representation, such as but not restricted to BSON or CBOR. Binary JSON (BSON) and Concise Binary Object Representation (CBOR) are binary serialization formats that can be used to efficiently store and transmit data within the method or system. BSON is a binary format designed to be lightweight and efficient for data storage, while CBOR is a compact binary format optimized for low-latency data exchange. Both formats support the storage and transmission of complex data structures, such as nested documents and arrays, while offering substantially more robust serialization and reversible encode/decode capabilities vs. text-based formats like JSON or XML. The method or system can be configured to utilize either BSON, CBOR, or other suitable serialization formats based on specific performance and compatibility requirements.

BSON, CBOR, and other lossless data formats can play a role in ensuring seamless data integration into the local database 106. Lossless formats enable efficient and accurate data representation, which can be useful for maintaining data integrity across databases of multiple entities 101. Additionally, BSON and CBOR are schema-less and support a wide range of data types, making them highly adaptable to different database systems and data structures. This flexibility allows the method or system to easily integrate data into various local databases 106 without the need for complex data transformation or loss of data fidelity that can occur with JSON or XML.

The method or system of the present disclosure can be integrated with various local databases 106, such as relational databases, NoSQL databases, or other types of data storage solutions. This allows the method or system to leverage existing data storage infrastructure and simplify data management for participating nodes 100. The method or system can be adapted to interact with different database systems using database connectors or APIs, which facilitate communication and data exchange between the method or system and the local database 106.

The method or system can accommodate a mixture of shared and unshared data within the local database 106 of each entity 101. "Shared data" refers to information that is accessible and synchronized among the multiple entities 101, while "unshared data" remains exclusive to the individual entity 101 and is not shared or synchronized with other entities 101.

The method or system of the present disclosure retains the characteristics of immutability and nonrepudiation that had previously been exclusively associated with blockchain technology. The method or system of the present disclosure achieves immutability by generating and storing cryptographic signatures for each data record. When a node 100 makes changes to the data, a new version of the record is created and a signature is created using the private key of the entity being serviced on behalf of the node 101, confirming the identity of the entity and the integrity of the change. Nonrepudiation is achieved by validating signatures against the public keys of the entities 101, which can be used to verify the authenticity of the record and prevent any entity 101 from denying responsibility. This process creates a tamper-evident and auditable record of all transactions within the method or system, ensuring data integrity and accountability among participating entities 101.

The method or system presented in the present disclosure can also leverage a distributed, decentralized, peer-to-peer architecture. This architecture can be designed to enhance the security, efficiency, and scalability of the method or system, offering significant advantages over traditional centralized databases and blockchain-based solutions.

In a distributed architecture, the cryptographically assured data sharing method or system distributes data across multiple nodes within the network, storing each data record or dataset within the local database 106 of the entities 101. By distributing the same data across numerous nodes, the method or system reduces the risk of engineered tampering at any one node because other nodes will not reflect the changes. Additionally, the distributed approach, as compared to a central authoritative source of data, eliminates traffic congestion at the central host, especially as a result of compute-intensive queries, ensuring that the method or system remains responsive and efficient even as the volume of shared data grows.

The method or system of the present disclosure operates on a decentralized architecture, eliminating the need for a central authority or single point of control. The decentralized nature of the method or system provides enhanced security and resilience, as there is no single point of failure that can be targeted or compromised by malicious actors. Furthermore, the decentralized architecture helps to prevent data manipulation or censorship, as all participating entities 101 within the network 102 have their own access to copies of the shared data and can verify its authenticity independently.

The method or system may incorporate peer-to-peer communication through a secure communication channel on the network 102, enabling direct and secure data exchange between participating nodes 100 without the need for intermediaries or central servers. The peer-to-peer communication model ensures that data is transmitted efficiently and securely, reducing the potential for latency or bottlenecks associated with traditional central server models.

Additional aspects of the present disclosure will now be illustrated by way of the following non-limiting example. In the present example, four companies, Oak.com, Cedar.com, Maple.com, and Pine.com, wish to share certain data using a three-phase process: setting up entity reference data (Activity A), establishing data record schemas and sharing specifications (again, "spec") (Activity B), and enabling ongoing data creation/modification with a sharing and signing workflow (Activity C).

In Activity A, participants set up reference data. Each company has its own database, which can be on-prem, in the cloud, as-a-service, or any combination thereof. Managed data is split into two domains: reference data (e.g., entities, keys, specs) and the actual data (e.g., staging/temporary, rejected, and validated delivery material). Each participant shares its own reference data including entity name, public cryptographic key, and address with others. The reference data can then be digitally signed by each participant and then shared with the other participants. The result is that each participant captures digital signatures, providing nonrepudiation and data integrity, for all the other participants.

In Activity B, participants establish specs. Data is segregated into sections based on participant access requirements and the appropriate access rights assigned. Section read/write entitlements are assigned according to the requirements. Specs are then co-signed and distributed among participants in the same manner as the entity reference data described in Activity A.

In Activity C, the ongoing operational use of the present example takes place. The sharing and signing workflow is initiated with the staging of a new record or the modification of any existing record, followed by three steps: (1) publishing to other nodes as described in the spec; (2) a "flurry" of cosigning activity, described below; (3) making the change transactionally visible when all necessary signatures are collected.

In the context of the present example, the term "flurry" refers to a stage in the process where multiple nodes 100, such as Maple and Cedar, are simultaneously collecting other signatures and publishing their own signatures for a given request. This stage is called "The Flurry" because there is a high level of concurrent activity among the participating nodes as they collaborate to finalize the change.

Integration with unshared data is achieved using foreign keys linking unshared and shared data. A "foreign key" is an industry standard data design concept and in the present disclosure, the foreign key is a field in a table of the local database 106 that is designed to establish a relationship with the shared data managed by the method or system. The foreign key enables a local table to reference the shared data for query purposes, allowing applications to access and integrate both local and shared data in a seamless manner.

By using a foreign key, the present disclosure allows participants to maintain existing local data structures and schemas while still being able to access and use the shared data effectively. This approach ensures data consistency and integrity across all participating entities while providing flexibility in the local data management and usage. As a result, participants have identical copies of both reference and target data, while maintaining unique local schemas. Moreover, by using foreign keys, the method or system can maintain consistency and establish connections between related data records encoded in BSON, CBOR, or other supported formats.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein. Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

In this disclosure and the following claims, the ordinary meaning of the word "or" is broadened to indicate an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

Any feature or element that is positively identified in this description may also be specifically excluded as a feature or element of an embodiment of the present disclosure as defined in the claims.

As used herein, the term "consisting essentially of" limits the scope of a specific claim to the specified materials or steps and those that do not materially affect the basic and novel characteristic or characteristics of the specific claim.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A cryptographically secured method of sharing at least one data record on a local database among multiple processing nodes, without using a blockchain, the method comprising:
   setting up reference data for multiple entities, where the entities are serviced by the nodes;
   facilitating cosigning of the reference data to create a record specification ("spec"), where the spec comprises at least one name of at least one section of the at least one data record; and for the at least one section, an assignment of access entitlement associated with the entities;
   sharing the at least one data record among the entities in a cryptographically assured way according to the spec, thereby creating a cryptographically secured duplicate of the at least one data record, where the cryptographically secured duplicate of the at least one data record corresponds to the at least one data record on the local database, where the cryptographically secured duplicate of the at least one data record is shared according to a level of the access entitlement associated with the entities, and where the cryptographically secured duplicate of the at least one data record is not recorded on a blockchain.

2. The method of claim 1, where setting up the reference data for the entities comprises:
   defining and distributing names of the entities; distributing, among the entities, public cryptographic keys associated with the entities;
   and distributing communications network addresses ("addresses") associated with the entities.

3. The method of claim 1, where the cosigning of the spec is performed using private cryptographic keys of the entities.

4. The method of claim 1, where each section further comprises a schema to enforce a structure or values of data in that section.

5. The method of claim 1, further comprising:
   initiating a modification to the at least one data record, where initiating the modification to the data record comprises:
   notifying the entities about a proposed modification to the data record;
   prompting those of the entities with entitlement to edit, to approve the proposed modification using their public cryptographic keys;
   upon receiving approval from the entities with entitlement to edit, creating a new version of the at least one data record, without storing the modification on a blockchain.

6. The method of claim 1, where the section is not visible to those of the entities who do not have read access to the section.

7. The method of claim 5, where creation of a new version of the at least one data record is not visible to those of the entities who do not have access to the at least one data record, until the modification is approved by those of the entities who do have access to the at least one data record.

8. The method of claim 1, where a level of access comprises:

create, modify, or audit.

9. The method of claim 1, where the local database comprises both shared and unshared data.

10. The method of claim 6, where at least one new version of the cryptographically secured duplicate of the at least one data record is persisted to the local database of at least one node using a lossless high-fidelity data representation.

11. The method of claim 1, where certain sections of the at least one data record are not visible to those of the entities who do not have access to those data sections.

12. The method of claim 3, where the private keys are not shared among the entities.

13. The method of claim 10, where the lossless high-fidelity data representation comprises BSON.

14. The method of claim 10, where the lossless high-fidelity data representation comprises CBOR.

15. A system for sharing at least one cryptographically secured data record on a local database among multiple entities, without using a blockchain, the system comprising:

the entities connected over a network ("network"), where the entities are configured to set up reference data over the network;

at least one node on the network, where the at least one node is configured to:

cosign the reference data and record specifications ("spec"). where the spec comprises at least one name of at least one section of the at least one data record; and for the at least one section, an assignment of access entitlement; and share a cryptographically secured duplicate of the at least one data record among the entities in a cryptographically assured way, where the cryptographically secured duplicate of the at least one data record corresponds to the at least one data record on the local database. where the cryptographically secured duplicate of the at least one data record is shared according to a level of access associated with the entities, and where the sharing of cryptographically secured duplicate of the at least one data record is not recorded on a blockchain.

* * * * *